United States Patent [19]

Heile et al.

[11] Patent Number: 6,026,226
[45] Date of Patent: Feb. 15, 2000

[54] LOCAL COMPILATION IN CONTEXT WITHIN A DESIGN HIERARCHY

[75] Inventors: Francis B. Heile; Tamlyn V. Rawls, both of Santa Clara; Alan L. Herrmann, Sunnyvale; Brent A. Fairbanks, Santa Clara; David Karchmer, Sunnyvale, all of Calif.

[73] Assignee: Altera Corporation, San Jose, Calif.

[21] Appl. No.: 08/958,798

[22] Filed: Oct. 27, 1997

Related U.S. Application Data

[60] Provisional application No. 60/029,277, Oct. 28, 1996.
[51] Int. Cl.[7] .................................................... G06F 17/50
[52] U.S. Cl. ................................ 395/500.13; 395/500.19
[58] Field of Search ............................................. 707/501

[56] References Cited

U.S. PATENT DOCUMENTS

| | | | |
|---|---|---|---|
| 5,499,192 | 3/1996 | Knapp et al. ............................ | 364/489 |
| 5,513,124 | 4/1996 | Trimberger et al. .................... | 364/491 |
| 5,661,660 | 8/1997 | Freidin .................................... | 364/489 |
| 5,691,912 | 11/1997 | Duncan ................................... | 364/490 |
| 5,696,454 | 12/1997 | Trimberger ............................. | 326/38 |
| 5,812,414 | 9/1998 | Butts ....................................... | 364/489 |
| 5,870,768 | 2/1999 | Hekmatpour ........................... | 707/501 |

*Primary Examiner*—Kevin J. Teska
*Assistant Examiner*—Thuan Do
*Attorney, Agent, or Firm*—Beyer & Weaver, LLP

[57] ABSTRACT

A technique for allowing local compilation at any level within a design hierarchy tree for a programmable logic device allows a user to compile within the context of the entire design using inherited parameter values and assignments from any parent nodes within the design hierarchy tree. A user is allowed to perform an isolated, local compilation that gives a compilation result as if the lower level node had been compiled within the context of the complete design. This local compilation is performed even though assignments, parameters, and logic options of parent nodes have not been compiled. An "action point" is specified at a node where a local compilation, timing analysis or simulation is to occur. A method compiles design source files that represent a PLD design. The design source files specify design entities that are represented as nodes in a design hierarchy tree. A first step analyzes the design source files to determine what design entities are represented in the source files. Starting from the root node down to the action point, the following steps are performed at each node: resolving current assignments based upon higher assignments at nodes located between the current node and the root node of said hierarchy tree, and elaborating the current node to produce a netlist. Once the action point node has been reached, then lower nodes of the hierarchy tree below the action point are elaborated down to the leaf nodes to produce a netlist for each of these lower nodes.

38 Claims, 10 Drawing Sheets

LOCAL COMPILATION IN CONTEXT WITHIN A DESIGN HIERARCHY

This application claims priority of provisional U.S. patent application No. 60/029,277, filed Oct. 28, 1996, entitled "Tools For Designing Programmable Logic Devices" which is incorporated by reference.

The present application is related to the following applications filed on the same date herewith: U.S. patent application No. 08/958,002 naming B. Pedersen et al. as inventors, entitled "Generation Of Sub-Net Lists For Use In Incremental Compilation"; U.S. patent application No. 08/958,436 naming J. Tse et al. as inventors, entitled "Fitting For Incremental Compilation Of Electronic Designs"; U.S. patent application No. 08/958,670 naming D. Mendel as inventor, entitled "Parallel Processing For Computer Assisted Design Of Electronic Devices"; U.S. patent application No. 08/958,626 naming F. Heile et al. as inventors, entitled "Interface For Compiling Design Variations In Electronic Design Environments"; U.S. patent application No. 08/958,778 naming T. Southgate as inventor, entitled "Method And Apparatus For Automated Circuit Design"; U.S. patent application No. 08/958,434 naming T. Southgate et al. as inventors, entitled "Graphic Editor For Block Diagram Level Design Of Circuits"; U.S. patent application No. 08/958,432 naming T. Southgate et al. as inventors, entitled "Design File Templates For Implementation Of Logic Designs"; U.S. patent application No. 08/958,414 naming T. Southgate as inventor, entitled "Method For Providing Remote Software Technical Support"; U.S. patent application No. 08/958,777 naming T. Southgate as inventor, entitled "Method For Simulating A Circuit Design"; U.S. patent application No. 08/958,435 naming F. Heile et al. as inventors, entitled "Workgroup Computing For Electronic Design Automation"; U.S. patent application No. 08/958,431 naming Alan L. Herrmann et al. as inventors, entitled "Embedded Logic Analyzer For A Programmable Logic Device"; and U.S. patent application No. 08/958,431 naming F. Heile as inventor, entitled "Electronic Design Automation Tool For Display Of Design Profile". The above related applications are incorporated herein by reference in their entireties for all purposes.

FIELD OF THE INVENTION

The present invention relates generally to electronic design automation. More specifically, the present invention relates to a technique for performing a local compilation within a design hierarchy in the context of the complete design hierarchy.

BACKGROUND OF THE INVENTION

In the field of electronics, various electronic design automation (EDA) tools are useful for automating the process by which integrated circuits, multi-chip modules, boards, etc., are designed and manufactured. In particular, electronic design automation tools are useful in the design of standard integrated circuits, custom integrated circuits (e.g., ASICs), and in the design of an integrated circuit that may be programmable. Integrated circuits that may be programmable by a customer to produce a custom design for that customer include programmable logic devices (PLDs). Programmable logic devices refer to any integrated circuit that may be programmed to perform a desired function and include programmable logic arrays (PLAs), programmable array logic (PAL), field programmable gate arrays (FPGA), and a wide variety of other logic and memory devices that may be programmed. Often, such PLDs are designed and programmed by an engineer using an electronic design automation tool that takes the form of a software package.

Within a particular electronics design project, a design hierarchy tree is developed using an EDA tool that represents the logic design of the integrated circuit, chip module, board or other electronic design. The design is composed of functional blocks, or design entities, that may be viewed symbolically as being represented in a design hierarchy tree having nodes that correspond to these functional blocks. In the process of creating a design that may be used to program such an electronic device, a compilation of the design produced by the EDA tool is performed. In most cases, the root of the design hierarchy tree (representing the top-level functional block of the design) is the point from which a user compiles the design.

By compiling from the root of the design, all of the lower level design entities within the design hierarchy tree are compiled within the context of the complete design. That is, any values, parameters, assignments or other general design requirements that are specified at the root are applied to any lower level design entity as long as compilation starts from the root. Often it will be desirable for a user to execute a compile at a node below the root in the design tree; however, such a local compilation presents difficulties in the prior art.

In the prior art compilation of such a design tree, a compile is performed from a node that is specified as the root. In fact, some currently available design tools only allow assignments to be specified at the root level. Thus, to perform a compilation at a node in the tree other than the true root, the user must specify such a lower level node as the root, perform a compile, and then change the root specification back to its original value once a compile has been performed. This changing of the specification of the root of the tree is cumbersome, time consuming, and can lead to further difficulties in tracking design requirements.

These further difficulties include failure to account for assignments that are made to the newly designated root from higher level entities in the hierarchy. Obviously, the result of such compilation is somewhat inaccurate because it does not include assignments from higher level entities. That is, if various parameter values and relative assignments are specified at the root level, different compilation results will occur for a particular lower level node depending upon whether that node is compiled locally in isolation, or whether it is compiled within the context of the complete design when compilation begins at the root. If the lower level node is compiled locally, then any parameter values and assignments specified above would not be used, which yields a different compilation result from what would occur if that particular node were compiled within the context of the complete design. In other words, when a local compilation is performed at a lower level node, parameter values and relative assignments from the root or any parent node are not inherited and used by the lower level node being compiled. Thus, during a local compilation, information such as parameter values, logic options, synthesis styles, etc., that has been specified at a higher level node is lost.

Of course, a user could designate a lower level node within the design tree as the root and specify the initial root's assignments at this lower level. Obviously, this presents the user with an extra burden. Further, if the user adds new assignments (not present in the original root) to the new lower level root, these assignments will be lost when the user finishes his or her compile and reassigns the root to the top-level node. Unfortunately, these assignments at a lower level node may be beneficial to the overall design, and as such the user would wish to keep that assignment for the complete design. However, when the user must reassign the root to the top-level node, any local assignments made at lower level nodes are lost.

The inability to make use of higher level information within a design tree when a local compilation is being performed is further exacerbated when using an EDA tool that allows for macrofunctions with parameters and relative hierarchical assignments. Macrofunctions with parameters are helpful for users wishing to create a design that makes use of variable parameters (such as for bus widths, logic flow, etc.). Relative assignments are also useful in that they allow a designer to uniquely specify an assignment for a logic device anywhere in the design. However, because the prior art does not allow lower level nodes within the design hierarchy tree to be compiled within the context of parameter values or relative assignments specified at the root level or some higher level (in the case of relative assignments), these parameter values and assignments are lost when a local compilation is performed.

Therefore, it would be desirable to have a technique that allowed local compilation within the context of the entire design at any node within a design hierarchy.

SUMMARY OF THE INVENTION

To achieve the foregoing and in accordance with the purpose of the present invention, a technique for allowing local compilation at any level within a design hierarchy tree is disclosed that allows a user to compile within the context of the entire design using inherited parameter values and assignments from any parent nodes within the design hierarchy tree. Thus, a user is allowed to perform an isolated, local compilation that gives a compilation result as if the lower level node had been compiled within the context of the complete design. This local compilation is performed even though assignments, parameters, logic options, etc., of parent nodes may not have been compiled. An "action point" is specified at a node where a local compilation, timing analysis or simulation is to occur.

In one embodiment of the invention, a method compiles design source files that represent an electronic design. The design source files specify design entities that are represented as nodes in a design hierarchy tree. A first step analyzes the design source files to determine what design entities are represented in the source files. Starting from the root node down to the action point, the following steps are performed at each node: resolving current assignments based upon higher assignments at nodes located between the current node and the root node of said hierarchy tree, parsing, analyzing and elaborating the source file for the current node to produce a netlist. Once the action point node has been reached, then lower nodes of the hierarchy tree below the action point are elaborated down to the leaf nodes to produce a netlist for each of these lower nodes. Thus, a local compile can be performed in the context of the whole design at the action point.

In another method of the invention, a design hierarchy tree is received having nodes representing design entities of an electronic design. Next, an action point is created at a local node located below the root node of the design hierarchy tree. The root node specifies root assignments. Local assignments at the local node are resolved based in part upon inheriting the root assignments. Finally, a local compile at the local node is performed using at least one of the root assignments. Thus, the local node is compiled within the context of the electronic design without having to compile each and every node above the node where the action point is specified.

The ability to compile a lower level functional block (or the node to which it corresponds) within the context of a complete design presents numerous advantages. For example, an engineer may wish to use a "divide and conquer" approach in compiling individual lower level blocks in order to find the source of an error. Another situation in which local compilation is helpful is in the context of a bottom-up design approach. In this situation, an engineer might not necessarily specify particular logic in higher level blocks when he or she is working on lower level blocks. That is, higher level blocks without a detailed design are specified as place holders encompassing the lower level blocks. In this bottom-up design approach, an engineer may wish to first compile, simulate and test the lowest level blocks before popping up a level and designing the next higher level block. Having the ability to compile these lower level blocks as if they were within the context of the complete design would be advantageous.

Furthermore, the ability to perform a local compile at any block at any level means that a user would not need to reassign the root of the design hierarchy tree every time it was desirable to perform a local compile. Also, any changes or edits to parameter values or assignments made at a lower level block would not be lost when the user returns to perform a compile from the root; these changes would be retained by the complete design because the root would not need to be continuously reassigned.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

In order to develop a design for programming an electronic design such as a programmable logic device (PLD), a programmable logic development system is used. As used herein, "electronic design" refers to circuit boards and systems including multiple electronic devices and multi-chip modules, as well as integrated circuits. For convenience, the following discussion will generally refer to "integrated circuits", or to "PLDs", although the invention is not so limited.

PROGRAMMABLE LOGIC DEVELOPMENT SYSTEM

Figure 1:
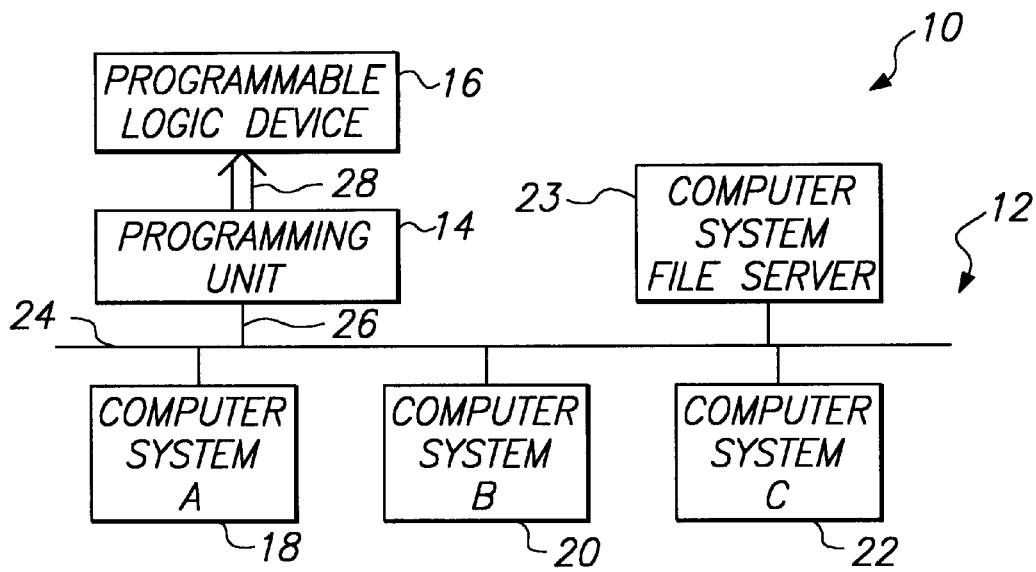
FIG. 1 is a block diagram of a programmable logic development system according to one embodiment of the present invention.

FIG. 1 is a block diagram of an embodiment of a programmable logic development system 10 that includes a computer network 12, a programming unit 14 and a programmable logic device 16 that is to be programmed. Computer network 12 includes any number of computers connected in a network such as computer system A 18, computer system B 20, computer system C 22 and computer system file server 23 all connected together through a network connection 24. Computer network 12 is connected via a cable 26 to programming unit 14, which in turn is connected via a programming cable 28 to PLD 16. Alternatively, only one computer system could be connected directly to programming unit 14. Furthermore, computer network 12 need not be connected to programming unit 14 at all times, such as when a design is being developed, but could be connected only when PLD 16 is to be programmed.

Programming unit 14 may be any suitable hardware programming unit that accepts program instructions from computer network 12 in order to program PLD 16. By way of example, programming unit 14 may include an add-on logic programmer card for a computer, and a master programming unit, such as are available from Altera Corporation of San Jose, California. PLD 16 may be present in a system or in a programming station. In operation, any number of engineers use computer network 12 in order to develop programming instructions using an electronic design automation software tool. Once a design has been developed and entered by the engineers, the design is compiled and verified before being downloaded to the programming unit. The programming unit 14 is then able to use the downloaded design in order to program PLD 16.

Such a programmable logic development system is used to create an electronic design. Design entry and processing occurs in the context of a "project". A project includes a project file, design files, assignment files, and simulation files, together with hierarchy information, system settings, and output files, which includes programming files and report files. A project database may also exist, which contains intermediate data structures and version information.

A project contains one or more hierarchies of design entities and each design hierarchy tree has a root entity, which is the topmost design entity in that hierarchy tree (the top-level functional block). Other design entities in the design hierarchy tree are called child entities. In an embodiment of the invention, the user specifies a file type and file name for each entity. Also, a design hierarchy may contain entities for which there is no corresponding design file, for example, in a top-down or bottom-up design methodology.

That part of a hierarchy which contains such not-yet-implemented entities is not compiled or simulated until a design file is supplied for each entity. In this case, template source files are automatically generated which have defined interfaces but empty bodies to assist in implementing these parts of a project. A user creates a design by specifying and implementing functional blocks, as will now be described in the context of an exemplary design methodology.

DESIGN METHODOLOGY

Figure 2:
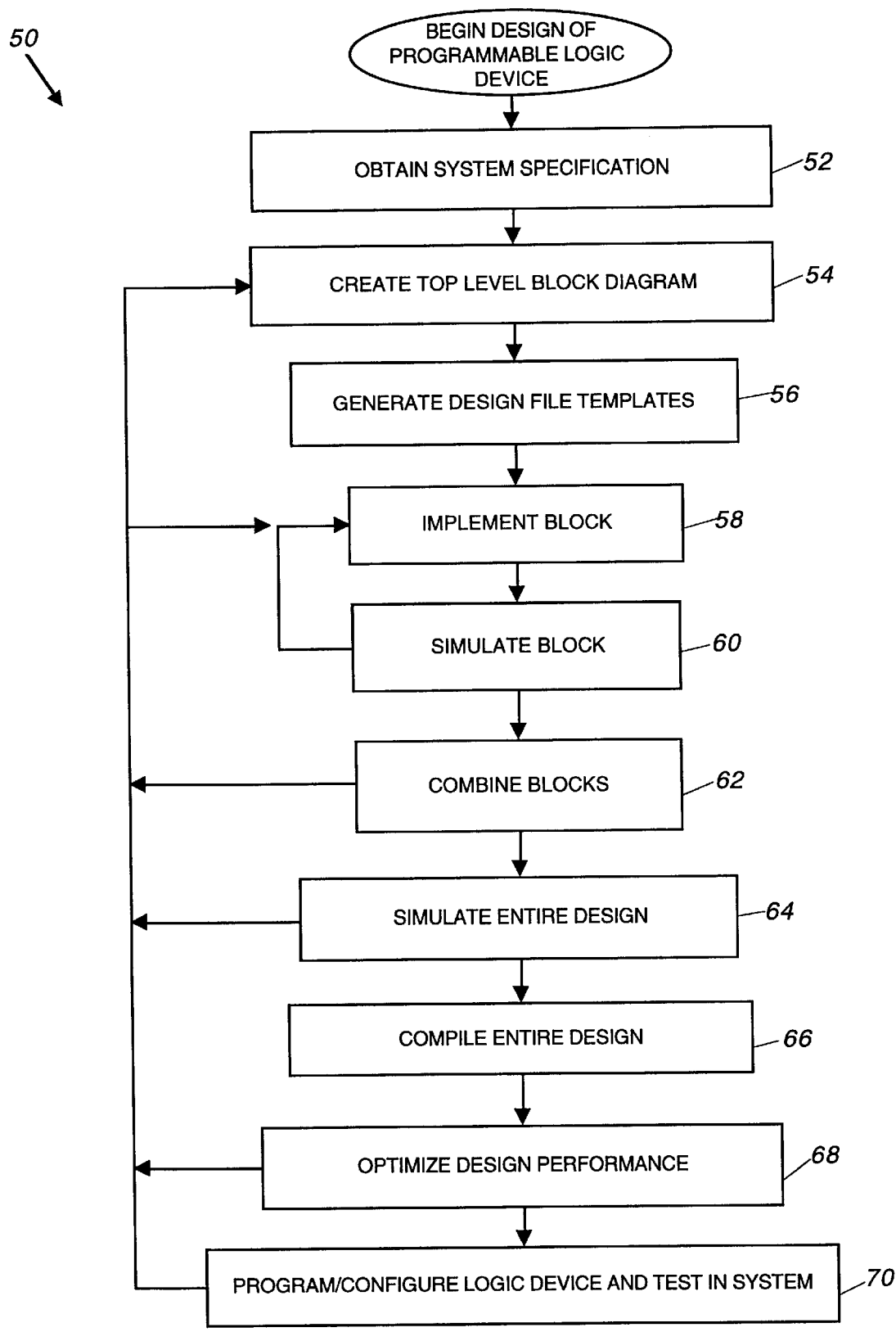
FIG. 2 is a flowchart of a design methodology used to design a programmable logic device (PLD) according to one embodiment of the present invention.

FIG. 2 shows a design methodology 50 for using a system design specification in order to develop a design with which to program a PLD. It should be appreciated that the present invention may be practiced in the context of a wide variety of design methodologies. By way of example, the action points of the present invention work well with an electronic design automation (EDA) software tool within the framework of the methodology of FIG. 2. Furthermore, as will be described in greater detail below, an action point may be set at any point within design methodology 50.

In step 52 a system specification for the PLD to be programmed is obtained. This specification is an external document or file that describes, for example, the device pin names, the functionality of each of the pins, the desired system functionality, timing and resource budgets, and the like. The multiple engineers within a work group will use this system specification in order to create a design with the EDA tool that will then be used to program a PLD.

Once the system specification is obtained, creation of a design using functional block diagrams is begun. In step 54 a top-level block diagram is created in which connections between lower-level designs blocks are specified. In this block, the target device, speed grade, and key timing requirements may be specified. Those skilled in the art will recognize that this top-level block may also include blocks that have already been developed or implemented or that have been obtained from a third party provider. This top-level block may also be converted into an HDL file, or the like, for use in other related design tools, such as an external simulator.

Step 56 includes generating design file templates with the EDA tool for all blocks present in the top-level block diagram of step 54. After the designer has created a block which has not yet been implemented, the system may generate a design file template. Such templates may display a block in a window format including, for example, a title, a date, etc. around the boundaries. It may also include some details of the functional content depicted within the window. The design file templates may be in any specified design format including VHDL, AHDL, Verilog, block diagram, schematic, or other like format. In the case of a VHDL block the template may also include much of the formatting and necessary syntax for any VHDL block.

Next, in step 58, each of the blocks of the top-level block is implemented using the EDA tool. Preferably, action points are set at a block while it is being implemented. It is noted that for more complicated designs, there may be additional levels of block diagrams (i.e., blocks within blocks). If changes are required at the top-level then the top-level block diagram is updated and the sub-designs are preferably automatically updated as well.

Furthermore, a block may be compiled through to a fitting stage for a particular integrated circuit die to provide information about resource utilization, timing performance, etc., as required for a given design. As such, it is envisioned that some timing optimization may be performed during step 58.

This sequence illustrates a style of design in which an engineer first designs, then compiles and simulates, and then returns to design again if the simulation results are not satisfactory. In another style, an engineer may iterate through a number of design followed by simulation loops before finally compiling the complete design.

Concerning block implementation order, one or more of the following factors can be used to determine implementation order: (1) the complexity of a block; (2) the uncertainty or risk associated with a block; and/or (3) how far upstream and/or downstream in a given data-path the block resides. Each of steps 60, 62, 64, 68 and 70 may also lead back to this block implementation step for additional implementation necessitated by later changes in the design.

In step 60 a block is simulated functionally at the source level using a behavioral simulator and vectors generated by using a VHDL or Verilog test bench, for example. The simulation results can then be displayed or otherwise presented/recorded as waveforms, text or annotated onto the source files. The designer may also return to step 58 to implement a block again. Also, at this point a block may be compiled or a timing analysis performed if a user wishes to simulate, compile and optimize blocks as he or she goes. If an action point has been specified, a compile, simulation or timing analysis can also take place in this step. In one embodiment, blocks are simulated in this step, and compilation and timing analysis are performed in steps 66 and 68. Although, preferably, some compilation and timing analysis is performed in this step to ensure that the design will fit in the electronic device.

Once the designer is satisfied with the simulation results, in step 62 the block is combined with other blocks and the resulting group is simulated together. In some cases, it may be useful to complete a full compilation to provide critical resource and timing information. Also, output simulation vectors from one block may become the input simulation vectors to the next block. The designer may also return to step 54 to modify the top-level block or to step 58 to implement a block again. Also, an action point may be specified for a combination of blocks.

Next, in step 64, the entire design is simulated functionally at the source level using a behavioral simulator. Preferably, the top-level block diagram is fully specified before simulation and shows complete design connectivity. Vectors can be generated using a VHDL or Verilog test bench. Again, the simulation results can be displayed either as waveforms or annotated onto the source files. The designer may also return to step 54 to modify the top-level block or to step 58 to implement a block again. In step 66 the entire design is compiled through to a file containing the information needed to program a PLD to implement the user's design, such as to a "programming output file".

A wide variety of compile techniques may be used depending upon the type of design being created. By way of example, a few examples of compilation are presented below. For a PLD, compilation includes the steps of synthesis, place and route, generation of programming files and simulation. For a traditional integrated circuit design with a custom layout, compilation includes a layout version schematic, a design rule checker and simulations. For integrated circuit design using a high level design tool, compilation includes synthesis from a language such as VHDL or Verilog, automatic place and route and simulations. For printed circuit boards, compilation includes automatic routing, design rule checking, lumped parameter extraction and simulation. Of course, other types of compilation and variations on the above are possible.

Following compilation in step 66, in step 68 the timing checker inside the compiler is used to determine if the performance goals for the design have been met. Also, timing simulations are used to check performance details. In addition, other analysis tools such as a design profiler and/or layout editor can be used to further optimize the performance of the design. Preferably, optimization is not performed prior to step 68 because full compilation is usually required to establish the location of one or more critical paths within the design. The designer may also return to step 54 to modify the top-level block or to step 58 to implement a block again.

Next, in step 70 the device is programmed/configured using programming unit 14 and tested in the system. Again, the designer may also return to step 54 to modify the toplevel block or to step 58 to implement a block again. While methodology 50 presents a topdown design process, it may also be used to support a bottom-up type methodology. Now that a design methodology has been described by which an engineer may develop a design for a PLD, an embodiment of a technique for allowing local compilation of blocks within the context of an entire design will be discussed.

FUNCTIONAL BLOCKS AND DESIGN ENTITIES

Figure 3:
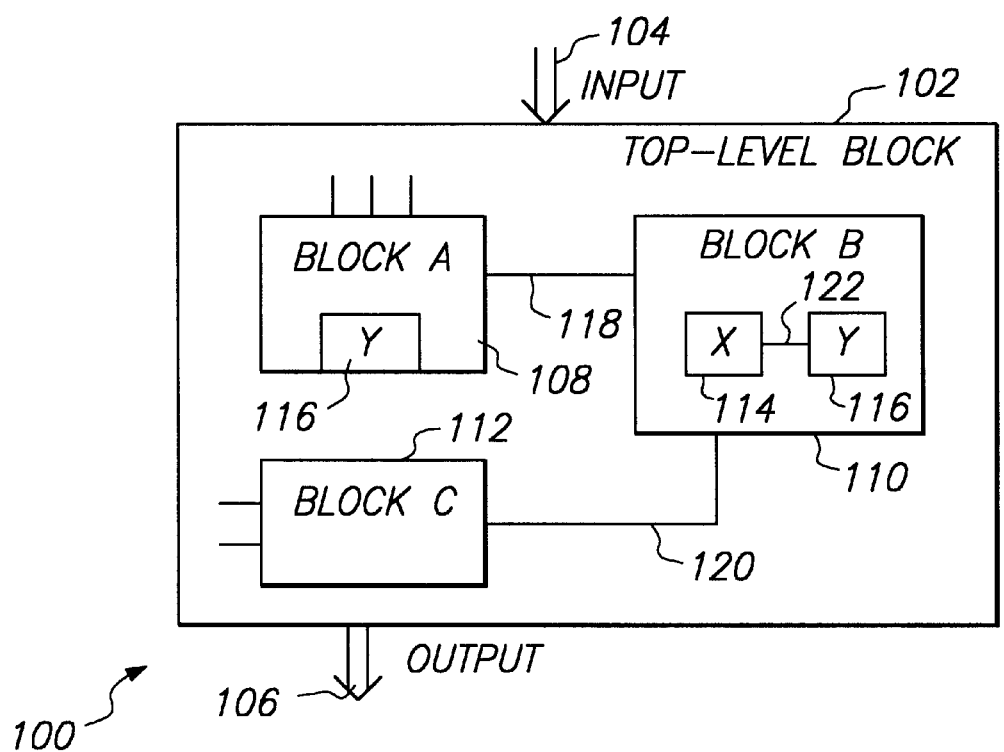
FIG. 3 is a block diagram of a design for a circuit to be implemented in a PLD that is created using an electronic design automation tool according to one embodiment of the present invention.

FIG. 3 illustrates a block diagram 100 of a design being created for a programmable logic device (PLD). Top-level block 102 represents the highest level of functionality associated with the design, and has an input 104 and an output 106. Input 104 represents the inputs to a PLD such as signals on the device input pins for that PLD. Likewise, output 106 represents the outputs from the device such as the signals on the device output pins of the PLD. Top-level block 102 achieves its high level functionality by the implementation of lower level blocks (or sub-blocks) block A 108, block B 110, and block C 112. Likewise, the functionality of block B is implemented by sub-blocks X 114 and Y 116. Similarly, block A also contains block Y 116. Typically, lower level blocks within a higher level (or parent) block are interconnected via connections 118, 120, and 122. These connections represent either input or output signals that travel between the parent block and the lower level block.

In this fashion, a design for a PLD is created by implementing blocks of logic functionality as will be appreciated by one of skill in the art. Any number of blocks may be created within the top-level block, and blocks may also contain sub-blocks such as shown in FIG. 3.

The blocks in a design may represent any number of functions or entities. In one example, block A 108 is a controller. Within this controller, sub-block Y 116 is a multiplexer. Block B 110 may be an Arithmetic Logic Unit (ALU), with sub-block X 114 being an adder and sub-block Y again being a multiplexer. In this example, block C 112 may be a memory module. Of course, other entities and arrangements may be provided in a design.

In one embodiment of the present invention, a block diagram such as shown in FIG. 3 is also represented in a design tree hierarchy. Examples of embodiments of a design tree hierarchy will be discussed below with reference to FIGS. 6 and 7. Block diagram 100 of FIG. 3 corresponds to one hierarchy tree within the project design. In this context, toplevel block 102 is also referred to as the root entity, and the lower level sub-blocks are referred to as child entities. In general, a block within a higher level block is termed a child entity of the parent entity (higher level block).

In a preferred embodiment, there can be more than one hierarchy tree within a given project design because there may be more than one root entity. In other words, each user participating in the PLD design may create their own design hierarchy tree that forms a part of the overall design. A design hierarchy tree is composed of design entities. A design entity such as block A may be provided in a wide variety of formats. By way of example, a design entity may represent the following kinds of objects within a project: user macrofunctions, user schematic macrofunctions, LPM functions, megafunctions, VHDL entity architecture design units, VHDL configuration design units, Verilog modules, EDIF cells inside an EDIF design, etc.

An entity is essentially that portion of the design contained within a single node of the design hierarchy tree. An entity contains primitives and may also contain other child entities. Also, any design entity may be a root, even while it is a child of another root or even a child of itself. Now that an embodiment of a block diagram for a project design has been described, the concept of inheritance of information from a higher level block will now be discussed.

INHERITANCE OF ASSIGNMENTS AND PARAMETERS

Figure 4:
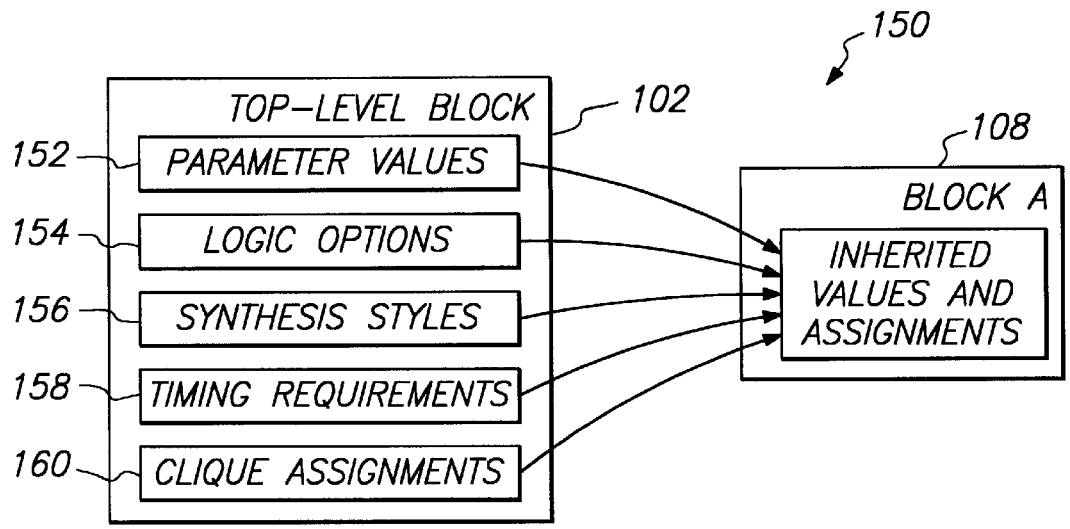
FIG. 4 illustrates symbolically how information assigned to the top-level block of FIG. 3 may be inherited by a lower level block.

FIG. 4 is a block diagram 150 that illustrates symbolically how parameter values and assignments associated with a top-level block 102 are inherited by a lower level block 108. Top-level block 102 contains parameter values 152 and a variety of relative assignments. Parameter values 152 may take a wide variety of forms. By way of example, parameter values may specify the width of a data or address bus, the type of adder to be used (such as carry-look-ahead), or whether 2's compliment or 1's compliment should be used. Other types of parameter values may also be specified. Parameter values can be tested in conditional constructs of an entity to change the logic generated depending on the value of the parameter.

A wide variety of relative assignments may be set at a block. By way of example, relative assignments include logic options 154, synthesis styles 156, timing requirements 158 and clique assignments 160. Logic options 154 may likewise take a wide variety of forms. By way of example, logic options allow the user to control the way that the design is mapped into the technology of the targeted device. These options control the mapping of the design into special features of the device; examples of these features are the use of carry chains, packed registers, I/O cell registers, etc. Logic options also control the techniques applied by the logic synthesizer; examples include duplicate logic reduction, refactorization and multi-level factoring, etc.

Synthesis styles 156 include a set of logic options, and may specify a style such as "fast" (producing a fast design, but uses more logic elements), "normal" (for a high density design), or a WYSIWIG (a design that reflects what the user has entered). Timing requirements 158 and clique assignments 160 are other examples of relative assignments. Clique assignments include lab cliques, row cliques, chip cliques and best fit cliques. A clique assignment is used to indicate which portions of the design should be placed near each other in order to achieve the highest performance design.

As will now be explained in greater detail, an embodiment of the present invention allowing relative hierarchical assignments and parameter values that are set at a higher level block to be inherited by any lower level block. In this fashion, a lower level block is compiled locally within the context of the complete design. Two mechanisms are used for resolving potentially conflicting assignments and parameters that have different inheritance schemes on a given primitive or entity in the design. These mechanisms relate to relative hierarchical assignments and parameters, and will be discussed in that order.

Firstly, regarding the inheritance of relative hierarchical assignments, rules are used to calculate the resolved relative hierarchical assignment value for a given type of assignment of a given object. Each rule is evaluated in order of its priority, although other priorities are possible. The rule with the highest priority is the one that wins. As a highest priority, explicit relative hierarchical assignments of this given type to this given object that are attached to a highest design entity in the hierarchy tree are resolved first. Relative hierarchical assignments attached to entities below that highest entity are ignored silently. As a second highest priority, for some logic options, the connectivity of the design's netlist determines the option resolved value. A third highest priority encompasses inherited assignments that are explicitly assigned (via some relative hierarchical assignment) to a hierarchy level closest to (but still above) the hierarchy level of the object. At a lowest level of priority are inherited assignments from the global project default settings. Since the global project default file has non-default values, there may be a non-default resolved value for every relative hierarchical assignment. If the global project default file is deleted, builtin defaults may be used.

Secondly, regarding inheritance of parameters, to determine the parameter value for a given parameter name for a given design entity, the following rules are used in the listed priority order, although other orders are possible. As a highest priority are parameter values that are explicitly assigned by the parent entity to a child entity. As a second highest priority are parameter values that are explicitly assigned by the parent of some other entity that is above the given design entity in the hierarchy tree. As a third highest priority are parameter values from the global project default parameter settings. As a lowest priority are default values for parameters defined in the design entity itself.

These rules and priority orders are exemplary of a preferred embodiment of the invention. Other variations of the rules or orders are possible. Also, there are exceptions to the inheritance rules listed above. For example, parameters such as "LPM_LATENCY" may not be inherited by the children of an entity since the children may need a smaller value of latency so that when they are combined the latency of the parent is achieved.

PARAMETER BLOCKS

Figure 5:
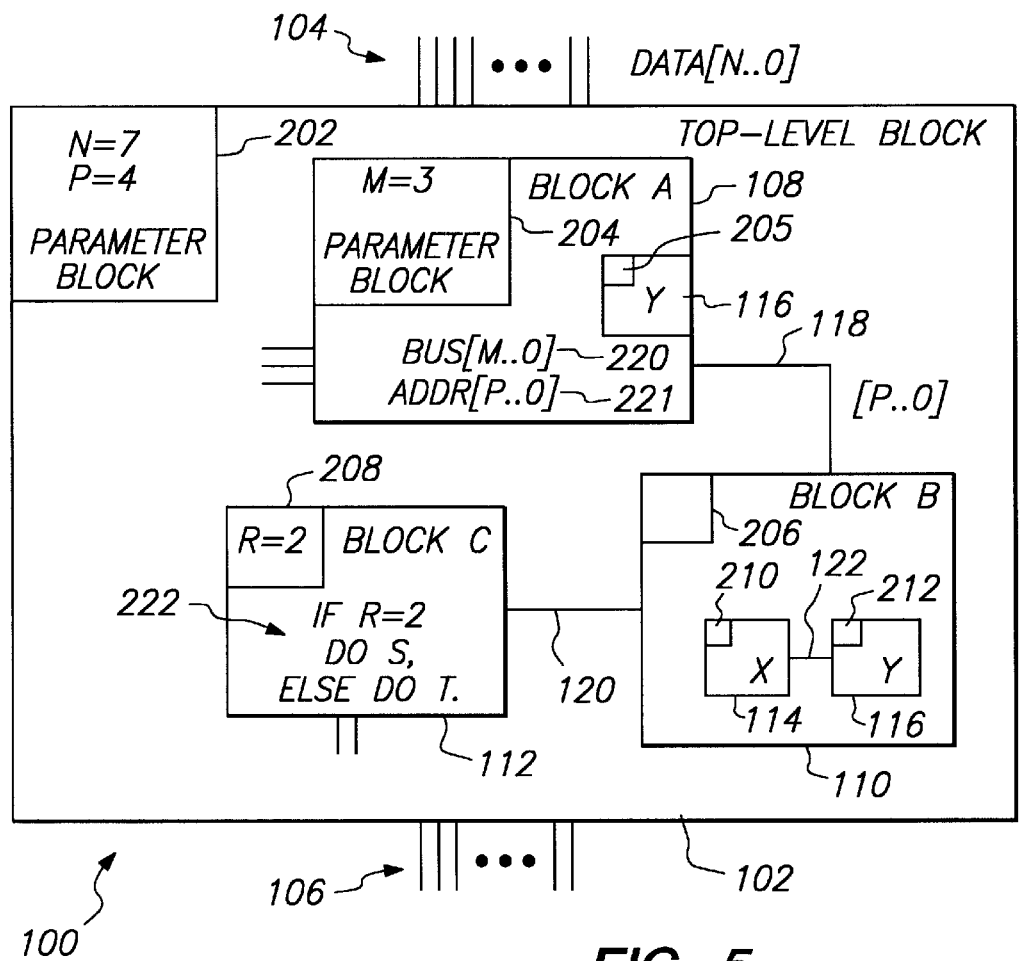
FIG. 5 illustrates in greater detail the block diagram of FIG. 3.

FIG. 5 illustrates in greater detail the block diagram of a design 100 as shown in FIG. 3. This block diagram 100 includes the blocks already described with reference to FIG. 3, namely top-level block 102, block A 108, block B 110, and block C 112. Additionally, input 104 is shown in this example as any number of data input lines DATA[N . . . 0]. Similarly, the output of top-level block 102 is shown as any number of output pins 106.

In one embodiment of the invention, a parameter block associated with each block of the block diagram contains parameters and assigned values for use within that block. As described above, parameter values assigned in a particular block may also be inherited by lower level blocks. For example, top-level block 102 has an associated parameter block 202, block A has a parameter block 204, block B has a parameter block 206, block C has a parameter block 208, and blocks X and Y within block B have corresponding parameter blocks 210 and 212. Block Y 116 within block A 108 has a parameter block 205 that may be different from parameter block 212.

The values assigned to parameters within a parameter block may be used for a wide variety of purposes within the design of a PLD. By way of example, parameter values may specify data or address widths, bus widths, logic branching options, and may be used in other situations where it is desirable to use a variable.

By way of example, parameter block 202 associated with top-level block 102 specifies parameters of N=7 and P=4. As seen in input 104 to the top-level block, the parameter N is used to specify the number of device pins in the input data. Blocks A and B use the parameter P to specify the number of lines 118 that transmit information between block A and block B. Similarly, parameter block 204 of block A specifies a parameter of M=3 where the variable M is used to specify the width of a bus 220 that is used inside the logic of block A. In addition, a parameter value may be used to affect the branching of logic statements used within a block. For example, parameter block 208 of block C specifies the parameter of R=2, where the variable R is used in logic statement 222 in order to perform a different function depending upon the current value of the parameter R. Another example of an inherited parameter use is where the width of the bus ADDR 221 is specified in the top level block 102 and inherited by block A 108. It should be appreciated that parameter values may be used in many other situations within the logic of a block diagram of a design in order to affect the outcome of the design.

Thus, the use of parameter values specified in a parameter block that is associated with an individual functional block allow for a much more powerful and flexible design of a PLD. Along with the ability to specify parameter values at the block level, it is advantageous to specify compile and simulation action points at the block level to take advantage of inheritance of these values.

ACTION POINTS

Generally, an action point designates or is associated with a node from which a local compile, local simulation, or local timing analysis can be performed in accordance with this invention. Preferably, the user is provided with the opportunity to set action points at desired locations within a design hierarchy. In this manner, the user can efficiently examine particular parts of a design in isolation.

Design systems can be provided with a myriad of different controls on how action points are specified. Preferably, the system will impose few limitations on how and where action points are specified. For example, the user may specify one or more action points at entities in the project, which need not be root entities, although, any root is automatically an action point. A different action point could, for example, be specified at each different instance of a given entity in any of the hierarchy trees of the project. The user can also specify that one particular action point, from among a group of action points, is the current action point. When the project is compiled, only the current action point acts as the root of the compile. Any action point which has a parent is compiled using parameters and logic options inherited from that parent, even though the logic of the parent design is not included in the compile. Preferred protocols for resolving potential conflicts among assignments is presented above. If the root is made an action point, it inherits the project default settings.

A variety of types of action points are possible. By way of example, two kinds of action points are compile action points and simulation action points. Preferably, each simulation action point is associated with a compile action point. There are a variety of kinds of activities that can take place at action points: compiling and timing analysis take place at compile action points, and simulations take place at simulation action points using netlists generated by the associated compile action point.

Figure 6:
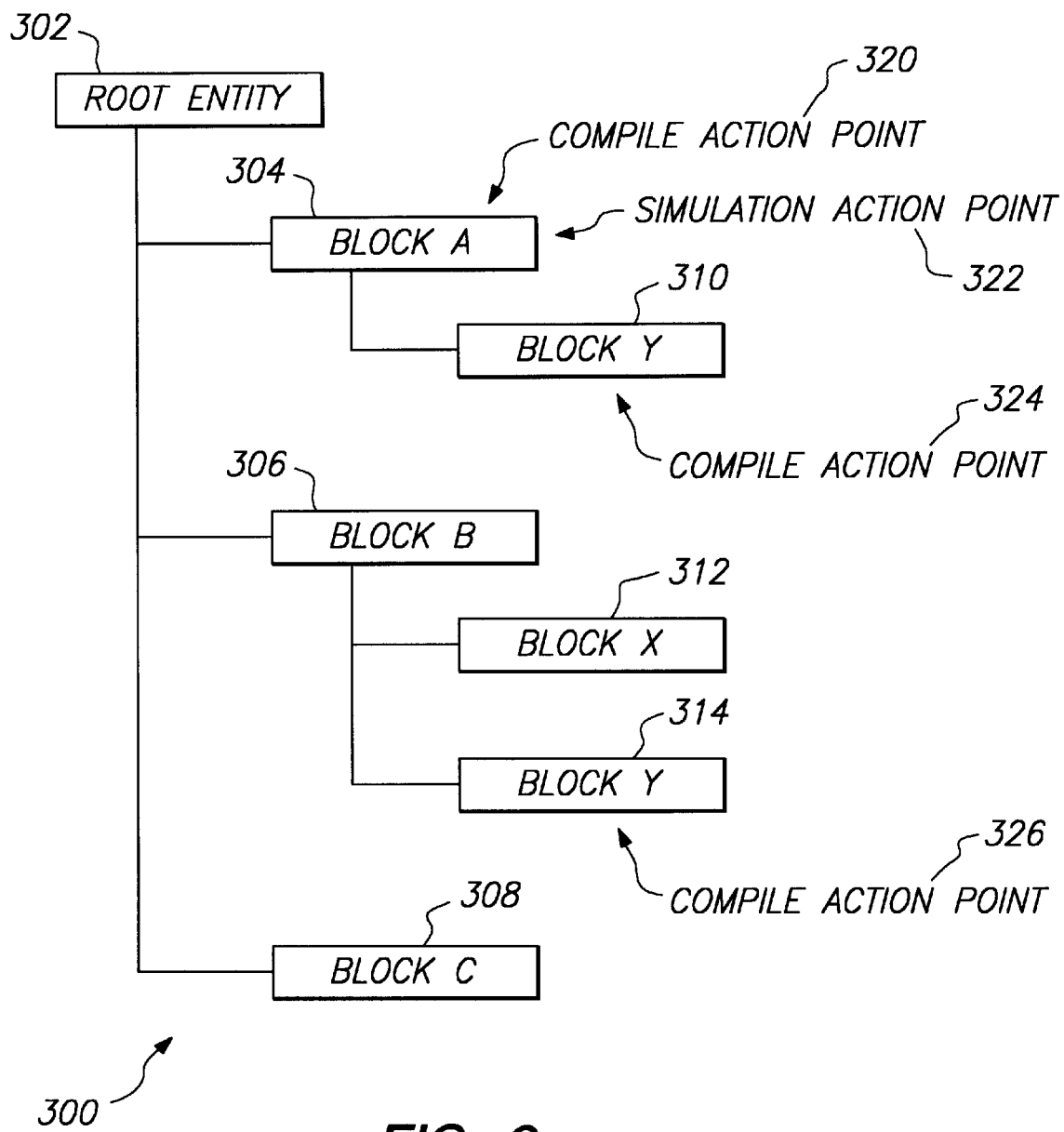
FIG. 6 is a design hierarchy tree corresponding to the design of FIG. 5.

Advantageously, compiling at an action point at a lower level node within a design hierarchy tree yields the same result as if the entire design had been compiled due to the inheritance of assignments and parameters discussed above. Performing a timing analysis also uses inherited information and thus benefits from the present invention. Likewise, performing a simulation uses inherited information. Various types of simulations may be performed depending upon the particular tool bench employed and the vectors used in the simulation. A behavioral simulation simulates the source file without synthesis and is influenced by parameter values; thus, a compiled result is not necessary. Compiled results are used for simulation on a synthesized netlist or simulation on a fully-compiled net list. FIG. 6 illustrates an example of the use of action points.

In one embodiment of a user interface suitable for use with the present invention, block diagram 100 as shown in FIG. 5 may be represented in a hierarchy tree 300 as shown in FIG. 6. This hierarchy tree 300 of design entities shows symbolically the hierarchical relationship between blocks in a design. For example, hierarchy tree 300 has a root entity node 302 that represents top-level block 102. This root entity contains three nodes, namely, node 304 (representing block A), node 306 (representing block B), and node 308 (representing block C). In a similar fashion, each node of the root entity may in turn have any number of sub-nodes. For example, node 304 has a leaf node 310 (representing block Y), and node 306 has two leaf nodes, namely node 312 and node 314 (representing respectively block X and block Y).

As shown in FIG. 6, a compile action point or a simulation action point may be specified at any of the nodes within the hierarchy tree. By way of example, compile action point 320 and simulation action point 322 are both specified at node 304. At node 310, compile action point 324 is specified. Similarly, compile action point 326 is specified at node 314. Thus, the user may make use of a variety of user interfaces and representations of the block diagram of the design in order to specify locations for compile and simulation action points. Techniques by which action points are created are discussed in FIGS. 8 and 9.

Figure 7:
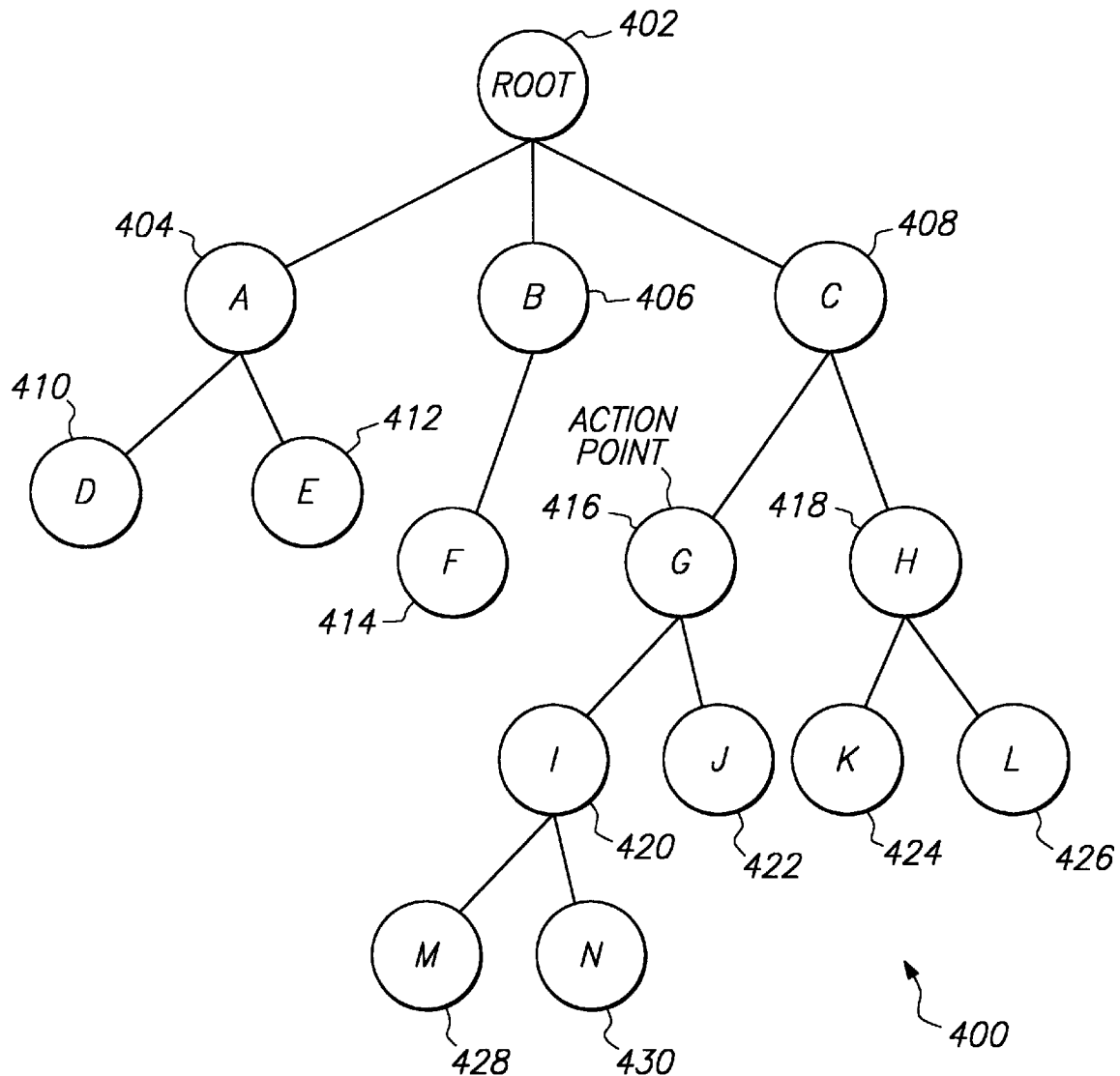
FIG. 7 is a design hierarchy tree for an alternative design having a number of levels.

FIG. 7 illustrates another embodiment of a hierarchy tree 400 that represents a different design for a PLD. Each of the nodes in tree 400 represents a design entity such as a functional block within a design. In this example, tree 400 has a root node 402 which has a number of nodes designated A through N, reference numbers 404 through 430, respectively. Each node, such as node C 408, represents a design entity within a design. For example, node F 414 represents a design entity F which is part of a design entity B, represented by node B 406. Also, because node B 406 is a child node of root node 402 in the design tree, this represents that design entity B is contained within the top-level block represented by the root node 402.

In this example, an action point has been specified at node G 416. Advantageously, this action point (a compile or a simulation action point) has been set at such a lower level node within tree 400 and is not constrained to only be specified at root 402. Tree 400 will be used with reference to the following flow charts to illustrate the use of action points.

CREATION OF ACTION POINTS

Figure 8:
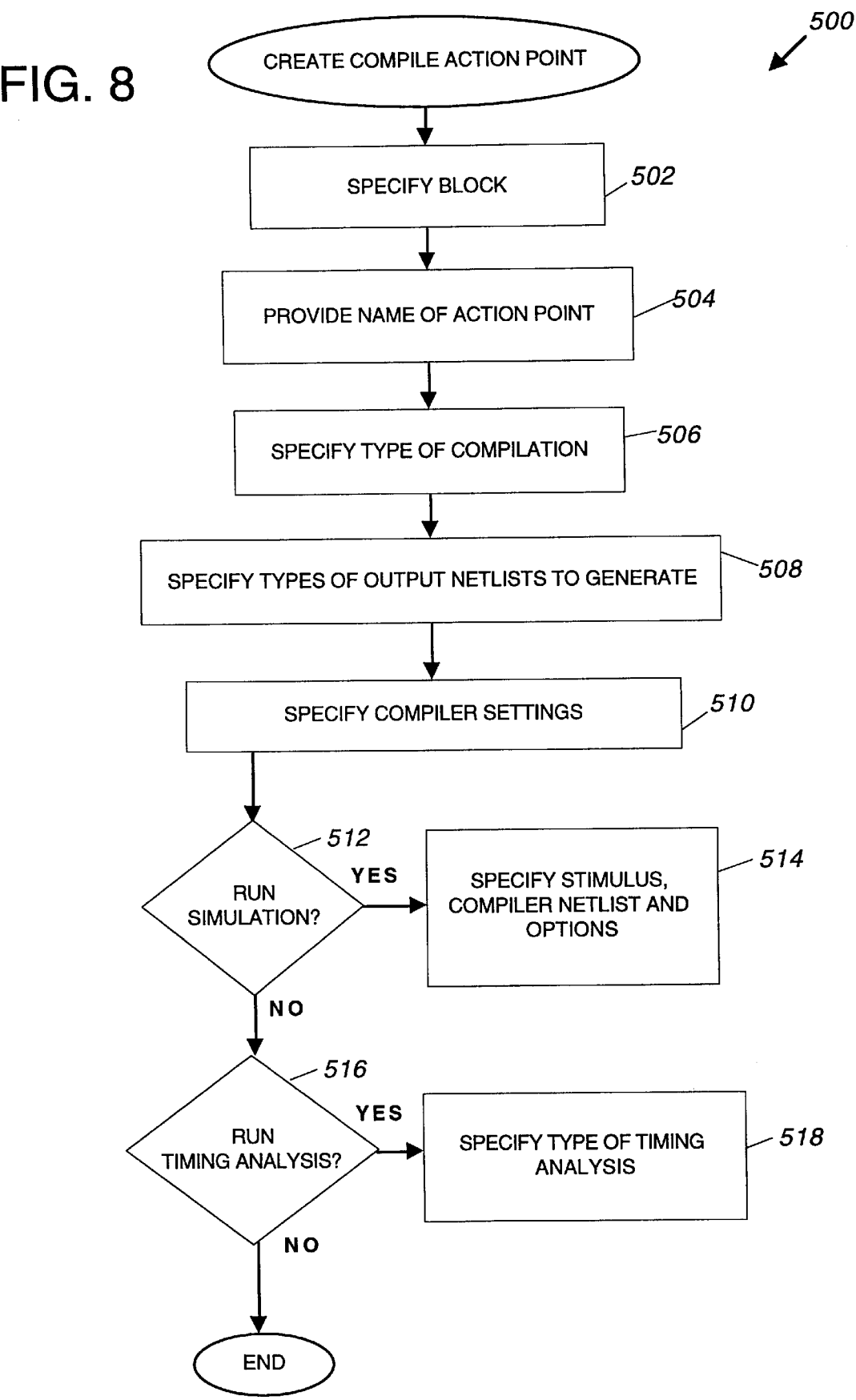
FIG. 8 is a flow chart illustrating how a compile action point may be created according to one embodiment of the present invention.

FIG. 8 is a flow chart 500 illustrating an embodiment of the invention in which a compile action point is created. A compile action point may be created by the user using a wide variety of user interfaces that symbolically display a PLD design. By way of example, a design may be displayed in a tree hierarchy such as shown in FIGS. 6 and 7. A compile action point is created and defined at a particular design entity within the PLD design so that a compile may be performed subsequently at that action point. In one embodiment of the invention, the user is prompted to specify the following information, although in other embodiments it is contemplated that the user would supply such information without prompting (e.g., by checking boxes or inserting characters in appropriate fields of one or more windows or dialog boxes), or default values would allow such information to be supplied automatically.

In step 502 a design entity, or block, is specified for the compile action point. For example, using FIG. 7 as an illustration, the user may specify using any suitable means that node G 416 should be a compile action point of the design. In step 504, the user provides a unique name for the action point. In step 506, the user specifies the type of compilation desired to be performed such as "extract only", "synthesize only" or "full compile". With the extract only option, compilation stops after netlist extraction and generates the post extraction netlist. With the synthesize only option, compilation stops after synthesis and generates the post synthesis netlist. Using the full compile option, compilation proceeds through synthesis and fitting and generates the full compile netlist. Of course, other variations on these compilation options are possible.

Step 508 specifies which type of output netlist to generate such as VHDL or Verilog. Other types of output netlists may also be specified. In step 510, other compiler settings such as the type of programming file to be generated, the kinds of processing algorithms to use or even to which device to target the design are specified.

Step 512 determines whether the user wishes to run any simulations as part of the compile. For each simulation that will be run, in step 514 the stimulus, the compiler netlist and other options are specified. The stimulus for the simulation may be provided in a wide variety of forms. By way of example, a stimulus may be a vector file listing inputs and values, or may also be a test bench. A test bench generates vectors algorithmically and is typically written by the user in a language such as VHDL or Verilog. The compiler netlist may be one of a post extraction netlist, the post synthesis netlist or a full compile netlist. Additional options such as "glitch detection" or "set up-hold violation detection" are also specified in this step.

Step 516 determines whether the user wishes to run a timing analysis as part of the compile. For each timing analysis that will be run, the user specifies the type of timing analysis in step 518. The user may specify that only certain timing requirements are to be checked, or may use a default timing analysis set up. This default timing analysis includes, by way of example, the following timing: T(PD) for all input pins to all output pins; T(CO) for all registers feeding output pins; T(SU)/T(H) for all registers; or F(MAX) for all registers clocked by the same clock. Alternatively, the user may specify a customized timing analysis set up by a timing analyzer tool. Once all of the compiler, simulation, and any timing settings have been specified, the procedure ends.

Figure 9:
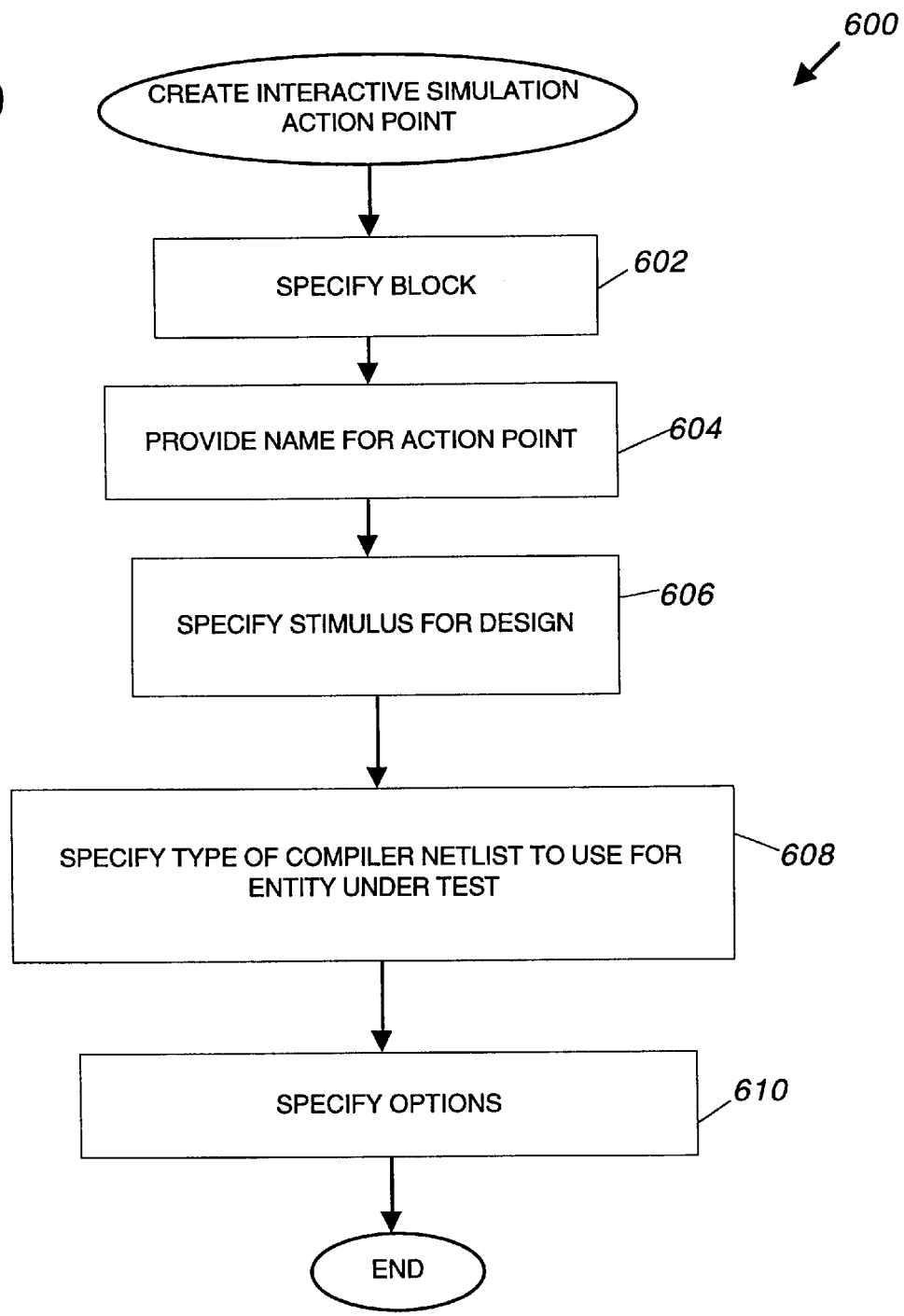
FIG. 9 is a flow chart illustrating how a simulation action point may be created according to one embodiment of the present invention.

FIG. 9 is a flow chart 600 illustrating an embodiment of the invention in which an simulation action point is created. Such an action point is created so that an simulation may be performed subsequently by the user at any of the design entities within the PLD design. As in the case of compile action points, any of a number of interfaces may be employed to receive information specifying information necessary to run a simulation. In step 602, a design entity or block within the design is specified. This step may be performed in a similar manner as in step 502. For example, the user may specify that node G 416 of FIG. 7 is an simulation action point. In step 604 a unique name is provided for this simulation action point.

In step 606, a stimulus for the design is specified such as a vector file or a test bench entity. In step 608 the type of compiler netlist to use for the entity under test is specified. This may be a post extraction netlist, a post synthesis netlist, a full compile netlist, or other. In step 610, any options such as those specified in step 514 or other information is specified. Once the above information has been provided, the procedure ends.

A simulation action point is preferably associated with a compile action point in one embodiment. In this embodiment, the netlists of the compile action point are used by the simulation action point, and the compiler stores either one or two complete netlists for the compile action point.

The first netlist is the post extraction netlist. For most kinds of design entities the user will be able to do a zero delay functional simulation with this netlist. In addition, for VHDL or Verilog design entities, this netlist allows behavioral (or source file) simulation of the design using the timing delays expressed in VHDL and Verilog (or the HDL file plus an SDF that back annotates timing information from VITAL compliant libraries).

The second netlist that may be generated by the compile action point is either the post synthesis netlist or the full compile netlist. In the case of the post synthesis netlist, an estimate of the timing delay is generated by considering, for example, the fan-out of logic cells. For a full compile netlist, the design has been fit into one or more devices and accurate timing delays can be calculated by taking into account the exact placement and routing of the design.

COMPILATION AT AN ACTION POINT

The following flow charts are useful in performing a compile, a simulation, or a timing analysis. When a compile is performed at an action point, that current action point is taken to be the root of the tree hierarchy for the purposes of that compile. All ports of that entity are regarded as top-level pins for fittings, timing analysis and vector based simulation. When the current action point uses a test bench, then the test bench file is treated as the top-level entity for simulation. Once any compile action points or simulation action points have been created by the user at any desired block, the user may then perform a compile at the action point.

Figure 10A:
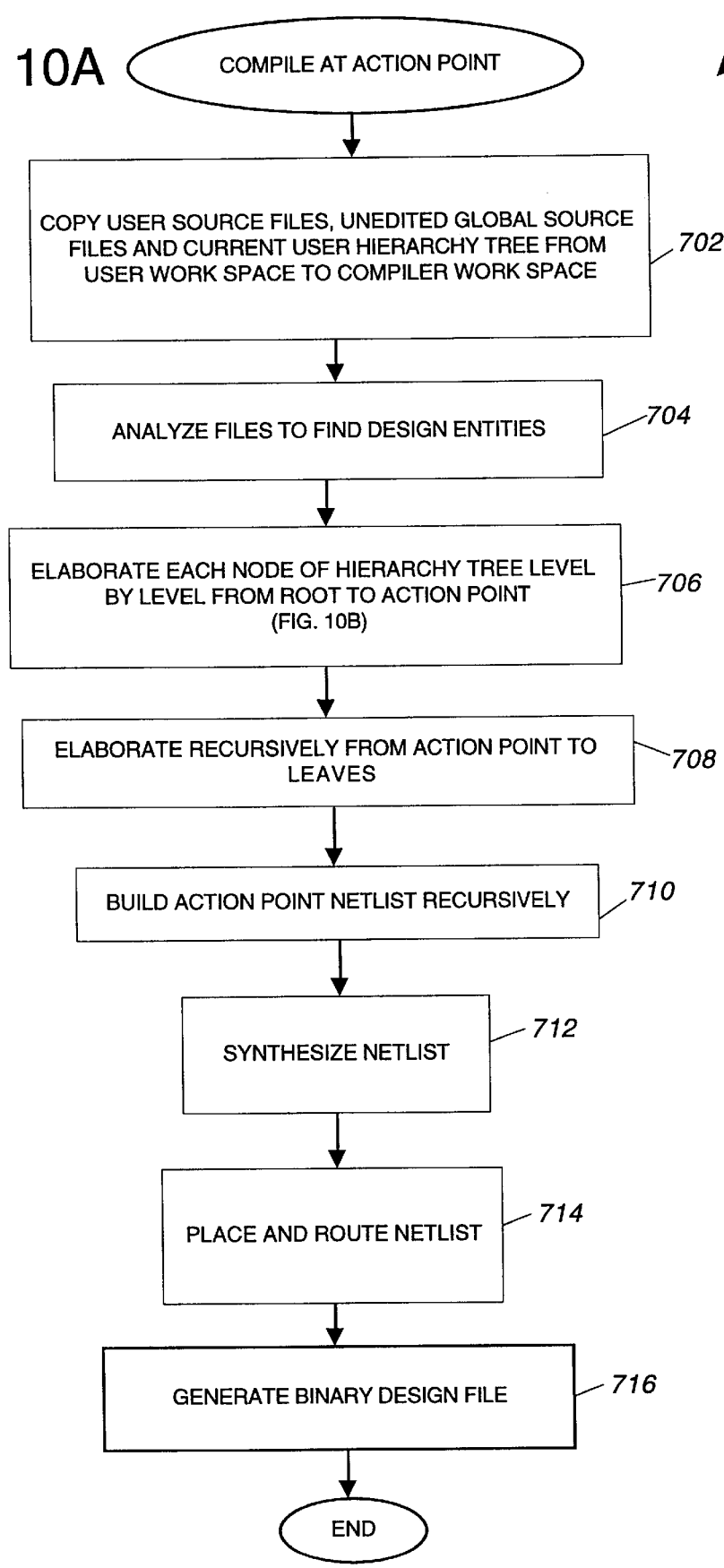
FIG. 10A is a flow chart illustrating how a local compilation occurs at an action point according to one embodiment of the present invention.

FIG. 10A is a flow chart 700 illustrating a method by which a compile is performed at an action point according to one embodiment of the present invention. The following steps will be explained with reference to FIG. 7, in which a user wishes to compile at the action point at node G 416 of the hierarchy tree. In this example, a particular user has generated hierarchy tree 400 in the context of an overall PLD design, and desires to compile at the action point at node G 416, instead of compiling from the root 402 of the tree.

In step 702, all of the user source files, the unedited global source files, and the current user hierarchy tree are copied from the user's work space to the compiler work space. These files are copied to the compiler work space, for one, so that the user may continue to work in the user work space.

The user source files are those files that the user is working on locally in his work space. In certain circumstances, not all of the global source files will be needed, especially if they are present in a branch of the tree that is not part of the compile and do not contain assignment information that could impact on the local compile. The current user hierarchy tree refers to the hierarchy tree representing the design that the user is working on in his work space. If a number of users are working on a PLD design within a work group, then each user may have his own hierarchy tree. Optimally, the whole tree is not needed, only that portion from the root down to the action point, and from the action point to the leaves. Copying of this hierarchy tree includes copying all of the relative assignments and parameter values that the user has specified up to that point in time. Alternatively, the ffects of copying files from the user work space could be achieved by marking the files in he user work space or by using any other suitable method.

In step 704 all of the copied files are analyzed in order to determine the design intities within the files. This step of analysis will be appreciated by one skilled in the art, and includes parsing the file, making sure the file is syntactically correct, and identifying all of the blocks within the file. This step is performed to determine which design entities are within all of the files.

In step 706 each node of the hierarchy tree is elaborated level by level from the root of the tree down to the action point. Advantageously, nodes above the action point need not be fully compiled, but are only elaborated until the action point is reached. This laboration step is used to determine the logic within each design entity and to discover all of the child entities within a given design entity. This elaboration also rebuilds or discovers the current hierarchy tree if the user had not supplied a hierarchy tree or if the tree was incomplete. Step 706 will be explained in greater detail in FIG. 10B below.

Once each node down to the action point has been elaborated, in step 708 elaboration is performed recursively from the action point down to the leaves in that portion of the tree below the action point. Using the example of FIG. 7, from the action point at node G, elaboration would occur recursively down through nodes I, J, M, and N because nodes J, M and N are the leaves of the tree below the action point at node G. This elaboration at each node in step 708 may also be performed in a similar fashion as described below in FIG. 10B. Step 708 results in a netlist being produced for each node of the tree at the action point and below.

Next, in step 710, an action point netlist is built recursively also starting from the action point node. In FIG. 7, the building would start at node G 416. This step is performed by using the netlists produced in the previous step for each of the nodes below the action point. In step 712 the action point netlist is synthesized, which involves rearranging the logic to minimize that required and fitting this logic into the logic elements of the device desired to be programmed. Step 712 is also considered a step of "technology mapping" in that the logic created is mapped onto the architecture of the device that is to be programmed.

In step 714 placement and routing of the netlist is performed. This step dictates where to place the logic elements within the device and how to wire them up physically. If a simulation is to be performed, timing delays are also calculated after the place and route step. Finally, in step 716 a binary design file is generated from the compilation. Once this procedure has ended, a compilation has successfully occurred at a lower level node within the complete design tree hierarchy.

Figure 10B:
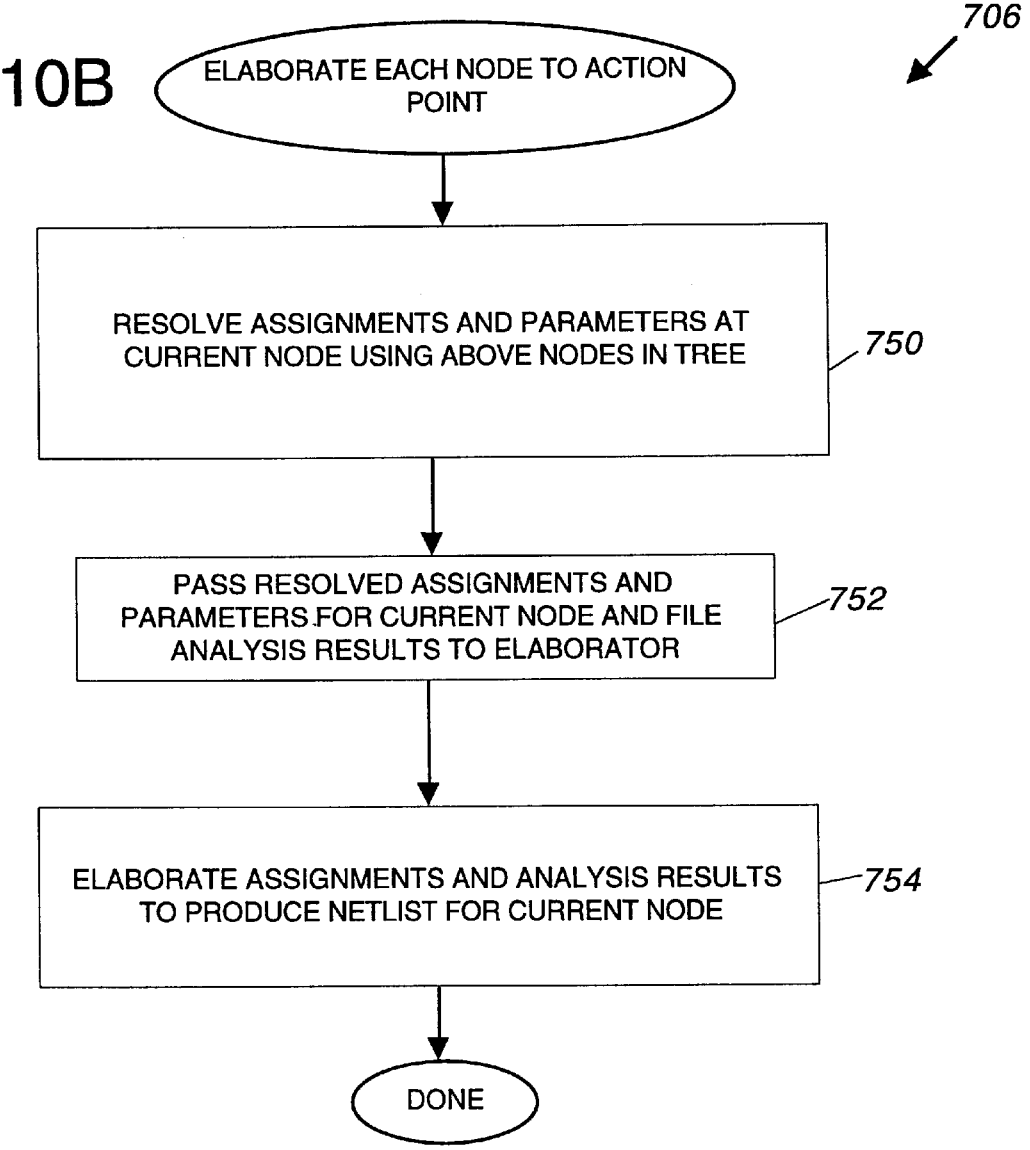
FIG. 10B is a flow chart illustrating an embodiment of the elaborate node step of FIG. 10A.

FIG. 10B is a flow chart representing step 706, the elaboration step of FIG. 10A. This step is performed at a current node within the tree hierarchy. In step 750 all assignments and parameters at the current node are resolved using above nodes in the hierarchy tree. This step of resolving assignments allows information to be inherited from higher level nodes down to lower level nodes and has been described above with reference to FIG. 4.

Once the assignments have been resolved at the current node, then in step 752, these resolved assignments and parameters are passed along with the file analysis results from step 704 to the elaborator. In step 754 the elaborator is used to elaborate these assignments, parameters and analysis results in order to produce a netlist for the current node. This output from the elaborator also includes a list of child entities of that node. This information is useful when the tree is being traversed in order to find the action point. This elaboration step also inputs all parameters values for the current node and produces the logic for the design entity represented by the current node. Once step 706 has completed, control returns to step 708 of FIG. 10A.

SIMULATION AT AN ACTION POINT

Simulating an entity-under-test makes use of a compile action point located at a node in the design hierarchy. In one embodiment, when a project is simulated with a test bench, the test bench is treated as the root of the hierarchy for the purposes of that simulation and is considered a parent of the node where the compile action point is located. The test bench instantiates the node designated the compile action point and compiles from that node.

In a preferred embodiment, a simulation hierarchy tree is separate from the compile hierarchy tree. The test bench is the root of the simulation hierarchy tree and instantiates a simulation node at which a simulation is to be performed. That simulation node has a pointer (or other indicator) indicating the corresponding compile action point node in the compile hierarchy tree from which the netlist will be obtained. The netlist for the design from the corresponding compile action point node in the compile hierarchy tree is then plugged into the simulation hierarchy tree at the simulation node. The simulation then uses the test bench to produce vectors for the simulation at the simulation node. For both of the above embodiments, logic options and other assignments and parameters for the entity under test will have the values specified in the design hierarchy tree above the compile action point. Thus, the user is simulating the design inside the environment of the overall project of which it is a part.

If a vector file is specified for a simulation, then the current simulation action point is treated as the root of the hierarchy. All ports of that entity are regarded as top-level pins for simulation, and the input vectors are supplied to these input pins. The results on the output pins and buried nodes are either compared with or "overwrite" the values for the output and buried values in the vector file. Actual overwriting may only occur upon a specific user command, but in the waveform window the input vectors and the output results may appear in the same window of a simulation tool—looking as if they were overwritten.

TIMING ANALYSIS AT AN ACTION POINT

A timing analysis is preferably performed at a compile action point. To run a timing analysis, the compile action point results preferably have either a post synthesis netlist or a full compile netlist. A normal compile on a compile action point automatically runs at least four different timing analyses on the design: T(PD), T(CO), T(SU)/T(H) and F(MAX).

A timing analyzer tool is used to set up customized timing analyses for a compile action point. In this way the user is able to specify that a particular analysis is to be run every time a normal compile is run. If the user wants to change the sets of inputs or outputs in a particular analysis, the user uses the timing analysis tool to set up the analysis and then saves the setup to the compile action point under either a new name or as the original name. These named timing analyses in a compile action point can be individually enabled or disabled for a normal compile. Thus, the timing analysis tool can use the "disabled" timing setups at a compile action point as a pool of named easily selectable timing analysis setups.

COMPUTER SYSTEM EMBODIMENT

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 11:
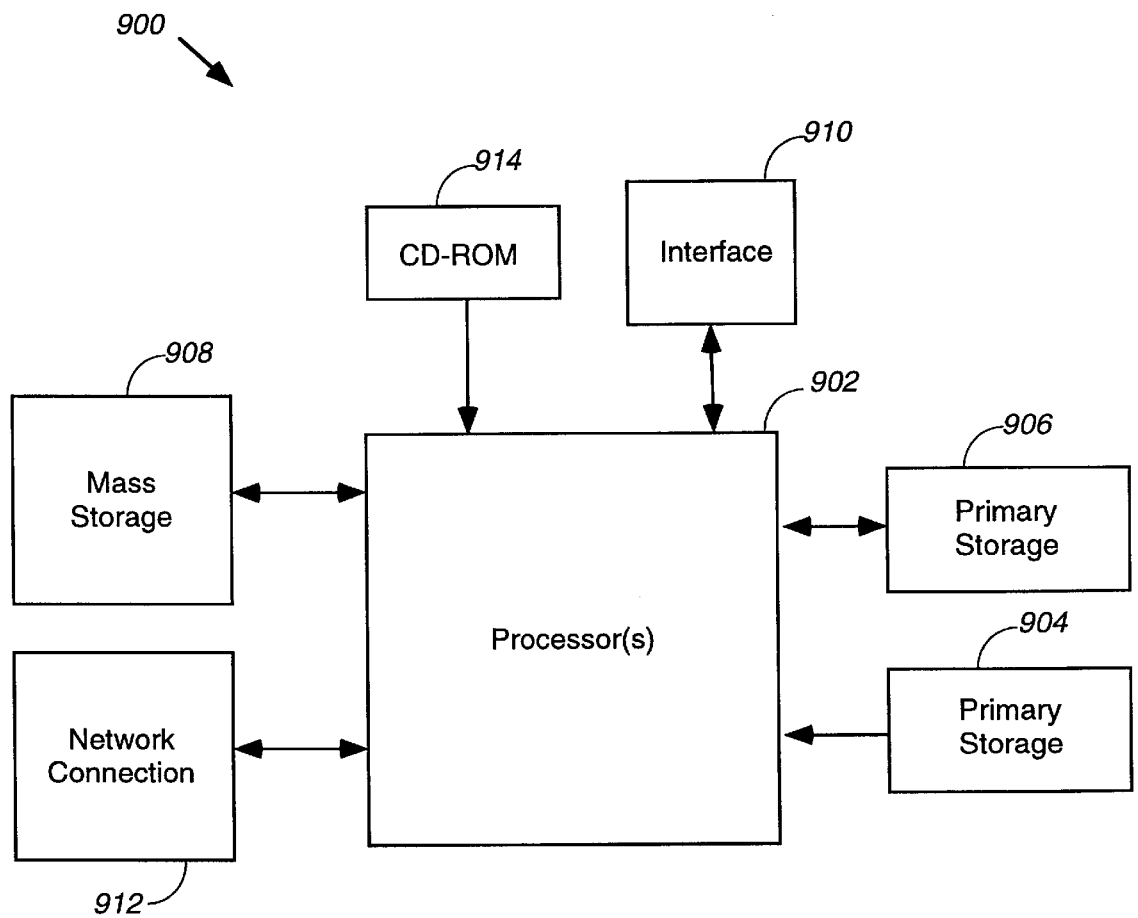
FIG. 11 is a block diagram of a typical computer system suitable for implementing an embodiment of the present invention.

FIG. 11 illustrates a typical computer system in accordance with an embodiment of the present invention. The computer system 900 includes any number of processors 902 (also referred to as central processing units, or CPUs) that are coupled to storage devices including primary storage 906 (typically a random access memory, or RAM), primary storage 904 (typically a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than primary storage. It will be appreciated that the information retained within the mass storage device 908, may, in appropriate cases, be incorporated in standard fashion as part of primary storage 906 as virtual memory. A specific mass storage device such as a CD-ROM 914 may also pass data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network using a network connection as shown generally at 912. With such a network connection, it is contemplated that the CPU might receive information from the network, or might output information to the network in the course of performing the method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. For instance, the present invention is applicable to a wide variety of electronic design automation including board level systems, multi-chip modules, integrated circuits, etc. Also, a variety of information besides assignments and parameters may be inherited by lower level blocks within a design hierarchy to facilitate local compilation. Furthermore, the particular inheritance techniques described may be modified as necessary for a variety of situations. Therefore, the described embodiments should be taken as illustrative and not restrictive, and the invention should not be limited to the details given herein but should be defined by the following claims and their full scope of equivalents.

We claim:

1. A computer-implemented method of compiling an electronic design specifying a plurality of design entities capable of being represented as a plurality of nodes in a design hierarchy tree, said method comprising the following:

identifying a node within said design hierarchy tree at which an action point is specified, said action point node specifying a point from which said design may be compiled, simulated and subjected to a timing analysis;

automatically applying to said node specified by said action point one or more assignments from one or more nodes located above said action point node; and elaborating lower nodes of said design hierarchy tree from said action point node where said action point is specified down to leaf nodes of said hierarchy tree located below said action point node to produce a netlist for each of said lower nodes, whereby a local compilation, simulation and timing analysis is performed at said action point node where said action point is specified.

2. The method of claim 1 wherein said design is provided as plurality of design source files.

3. The method of claim 1 wherein said identifying and applying involve performing the following for each node from a root node of said hierarchy tree down to said action point node where an action point is specified:

resolving current assignments at a current node based in part upon higher assignments at nodes located between said current node and said root node of said design hierarchy tree such that said higher assignments are inherited by said current node, and elaborating said current node to produce a netlist for said current node.

4. A computer-implemented method of compiling a plurality of design source files representing an electronic design, said design source files specifying a plurality of design entities capable of being represented as a plurality of nodes in a design hierarchy tree, said method comprising:

analyzing one of said plurality of design source files to determine design entities represented in said source file;

performing the following for each node from a root node of said hierarchy tree down to a first node where an action point is specified, resolving current assignments at a current node based in part upon higher assignments at nodes located between said current node and said root node of said hierarchy tree, such that said higher assignments are inherited by said current node, and elaborating said current node to produce a netlist for said current node;

elaborating lower nodes of said hierarchy tree from said first node where said action point is specified down to leaf nodes of said hierarchy tree located below said first node to produce a netlist for each of said lower nodes, whereby a local compile is performed at said first node where said action point is specified.

5. A method as recited in claim 4 wherein said electronic design specifies a programmable logic device and results of said local compile are used to program said programmable logic device.

6. A method as recited in claim 4 further comprising:

building an action point netlist at said first node using said netlists produced for said lower nodes;

synthesizing said action point netlist;

placing and routing said action point netlist; and generating a binary programming file suitable for programming said electronic design.

7. A method as recited in claim 4 wherein said elaborating lower nodes of said hierarchy tree includes resolving lower assignments at each of said lower nodes based in part upon higher assignments at nodes located between said lower node and said root node of said hierarchy tree, such that said higher assignments are inherited by said lower node.

8. A method as recited in claim 4 further comprising:

analyzing each of said plurality of design source files to determine said plurality of design entities represented in said design source files; and creating said design hierarchy tree based upon said determined plurality of design entities, such that said design hierarchy tree is used in said compilation.

9. A method as recited in claim 4 wherein said current assignments and said higher assignments include at least one of relative hierarchical assignments and parameters.

10. A method as recited in claim 4 wherein said action point is a simulation action point and said method of compiling is used for performing a simulation.

11. A method as recited in claim 4 wherein said action point is compile action point and said method of compiling is used for performing a timing analysis of said electronic design.

12. A computer-implemented method of compiling a plurality of design source files specifying a plurality of design entities representing an electronic design, said method comprising:

receiving a design hierarchy tree having a plurality of nodes, each of said nodes representing one of said design entities of said electronic design;

creating an action point at a local node located below a root node of said design hierarchy tree, said root node having associated root assignments;

resolving local assignments at said local node based in part upon said root assignments, such that at least one of said root assignments is inherited by said local assignments; and performing a local compile from said local node using at least one of said root assignments, such that said local node is compiled within the context of said electronic design represented by said design hierarchy tree, and such that a portion of said design hierarchy tree located above said local node is not compiled.

13. A method as recited in claim 12 wherein said electronic design is a programmable logic device and said local compile is used for testing a portion of said programmable logic device.

14. A method as recited in claim 12 wherein said step of performing a local compile includes:

building an action point netlist at said local node;

synthesizing said action point netlist;

placing and routing said action point netlist; and generating a binary programming file suitable for programming said electronic design.

15. A method as recited in claim 12 wherein said resolving local assignments at said local node includes a sub-step of resolving higher assignments at nodes located between said local node and said root node of said hierarchy tree, such that said higher assignments are inherited by said local node.

16. A method as recited in claim 12 further comprising:
analyzing each of said plurality of design source files to determine said plurality of design entities represented in said design source files; and
creating said design hierarchy tree based upon said determined plurality of design entities, such that said design hierarchy tree is used in said compilation.

17. A method as recited in claim 12 wherein said root assignments and said local assignments include at least one of relative hierarchical assignments and parameters.

18. A method as recited in claim 12 wherein said action point is a simulation action point and said method further comprises the step of:
performing a simulation from said local node.

19. A method as recited in claim 12 wherein said action point is compile action point and said method of compiling is used for performing a timing analysis of said electronic design.

20. A computer program product comprising a computer-usable medium having computer-readable program code embodied thereon for compiling a plurality of design source files representing an electronic design, said design source files specifying a plurality of design entities capable of being represented as a plurality of nodes in a design hierarchy tree, said computer program product comprising computer-readable program code for effecting the following steps within a computer system:
analyzing one of said plurality of design source files to determine design entities represented in said source file;
performing the following steps for each node from a root node of said hierarchy tree down to a first node where an action point is specified,
resolving current assignments at a current node based in part upon higher assignments at nodes located between said current node and said root node of said hierarchy tree, such that said higher assignments are inherited by said current node, and
elaborating said current node to produce a netlist for said current node;
elaborating lower nodes of said hierarchy tree from said first node where said action point is specified down to leaf nodes of said hierarchy tree located below said first node to produce a netlist for each of said lower nodes, whereby a local compile is performed at said first node where said action point is specified.

21. A computer program product as recited in claim 20 wherein said electronic design specifies a programmable logic device and results of said local compile are used to program said programmable logic device.

22. A computer program product as recited in claim 20 further comprising computer-readable program code for effecting the following:
building an action point netlist at said first node using said netlists produced for said lower nodes;
synthesizing said action point netlist;
placing and routing said action point netlist; and
generating a binary programming file suitable for programming said electronic design.

23. A computer program product as recited in claim 20 wherein said elaborating lower nodes of said hierarchy tree includes resolving lower assignments at each of said lower nodes based in part upon higher assignments at nodes located between said lower node and said root node of said hierarchy tree, such that said higher assignments are inherited by said lower node.

24. A computer program product as recited in claim 20 further comprising computer-readable program code for effecting the following:
analyzing each of said plurality of design source files to determine said plurality of design entities represented in said design source files; and
creating said design hierarchy tree based upon said determined plurality of design entities, such that said design hierarchy tree is used in said compilation.

25. A computer program product as recited in claim 20 wherein said current assignments and said higher assignments include at least one of relative hierarchical assignments and parameters.

26. A computer program product as recited in claim 20 wherein said action point is a simulation action point and said compiling is used for performing a simulation.

27. A computer program product as recited in claim 20 wherein said action point is compile action point and said compiling is used for performing a timing analysis of said electronic design.

28. A computer program product comprising a computer-usable medium having computer-readable program code embodied thereon for compiling a plurality of design source files specifying a plurality of design entities representing an electronic design, said computer program product comprising computer-readable program code for effecting the following within a computer system:
receiving a design hierarchy tree having a plurality of nodes, each of said nodes representing one of said design entities of said electronic design;
creating an action point at a local node located below a root node of said design hierarchy tree, said root node having associated root assignments;
resolving local assignments at said local node based in part upon said root assignments, such that at least one of said root assignments is inherited by said local assignments; and
performing a local compile from said local node using at least one of said root assignments, such that said local node is compiled within the context of said electronic design represented by said design hierarchy tree, and such that a portion of said design hierarchy tree located above said local node is not compiled.

29. A computer program product as recited in claim 28 wherein said electronic design is a programmable logic device and said local compile is used for testing a portion of said programmable logic device.

30. A computer program product as recited in claim 28 wherein said performing a local compile includes:
building an action point netlist at said local node;
synthesizing said action point netlist;
placing and routing said action point netlist; and
generating a binary programming file suitable for programming said electronic design.

31. A computer program product as recited in claim 28 wherein said resolving local assignments at said local node includes resolving higher assignments at nodes located between said local node and said root node of said hierarchy tree, such that said higher assignments are inherited by said local node.

32. A computer program product as recited in claim 28 further comprising computer-readable program code for effecting the following:

analyzing each of said plurality of design source files to determine said plurality of design entities represented in said design source files; and creating said design hierarchy tree based upon said determined plurality of design entities, such that said design hierarchy tree is used in said compilation.

33. A computer program product as recited in claim 28 wherein said root assignments and said local assignments include at least one of relative hierarchical assignments and parameters.

34. A computer program product as recited in claim 28 wherein said action point is a simulation action point, said computer program product further comprising computer-readable program code for effecting the following:

performing a simulation from said local node.

35. A computer program product as recited in claim 28 wherein said action point is compile action point and said compiling is used for performing a timing analysis of said electronic design.

36. A computer-readable medium comprising computer code for compiling a design specifying a plurality of design entities capable of being represented as a plurality of nodes in a design hierarchy tree, said computer code of said computer-readable medium effecting the following:

identifying a node within said design hierarchy tree at which an action point is specified, said action point node specifying a point from which said design may be compiled, simulated and subjected to a timing analysis;

automatically applying to said node specified by said action point one or more assignments from one or more nodes located above said action point node; and elaborating lower nodes of said design hierarchy tree from said action point node where said action point is specified down to leaf nodes of said hierarchy tree located below said action point node to produce a netlist for each of said lower nodes, whereby a local compilation, simulation and timing analysis is performed at said action point node where said action point is specified.

37. A computer-readable medium as recited in claim 36 wherein said design is provided as plurality of design source files.

38. A computer-readable medium as recited in claim 36 wherein said identifying and said applying involve performing the following for each node from a root node of said hierarchy tree down to said action point node where an action point is specified:

resolving current assignments at a current node based in part upon higher assignments at nodes located between said current node and said root node of said design hierarchy tree such that said higher assignments are inherited by said current node, and elaborating said current node to produce a netlist for said current node.

* * * * *